United States Patent
Cyrek et al.

(10) Patent No.: US 10,913,256 B2
(45) Date of Patent: Feb. 9, 2021

(54) KEVLAR WRAP REMOVAL FROM FAN CASING

(71) Applicant: GENERAL ELECTRIC COMPANY, Schenectady, NY (US)

(72) Inventors: Michal Jerzy Cyrek, Mazowieckie (PL); Mariusz Pawel Staszak, Zachodniopomorskie (PL); Leszek Jozef Moczulski, Mazowieckie (PL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/983,552

(22) Filed: May 18, 2018

(65) Prior Publication Data
US 2018/0333947 A1    Nov. 22, 2018

(30) Foreign Application Priority Data

May 19, 2017  (PL) .......................... 421648

(51) Int. Cl.
*B32B 43/00* (2006.01)
*F01D 25/00* (2006.01)
(Continued)

(52) U.S. Cl.
CPC ........ *B32B 43/006* (2013.01); *B29C 63/0013* (2013.01); *F01D 21/045* (2013.01);
(Continued)

(58) Field of Classification Search
CPC . B32B 38/10; B32B 43/006; Y10T 156/1153; Y10T 156/1174; Y10T 156/1911; Y10T 156/195; Y10T 156/1956
(Continued)

(56) References Cited

U.S. PATENT DOCUMENTS

| 2,814,329 A | 11/1957 | Shitton |
| 3,216,350 A * | 11/1965 | Sharkey ............... B41L 19/003 |
| | | 101/471 |

(Continued)

FOREIGN PATENT DOCUMENTS

| CN | 1057505 A | 1/1992 |
| GB | 1245415 A | 9/1971 |
| JP | 2011-088363 A | 5/2011 |

OTHER PUBLICATIONS

Extended European Search Report and Opinion issued in connection with corresponding EP Application No. 18171907.1 dated Aug. 7, 2018.

(Continued)

*Primary Examiner* — Mark A Osele
*Assistant Examiner* — Nickolas R Harm
(74) *Attorney, Agent, or Firm* — Dority & Manning, P.A.

(57) ABSTRACT

Methods for removing a fiber-reinforced wrap from a fan casing are provided. The method may include heating the fiber-reinforced wrap while on a metal support (e.g., aluminum, steel, etc.) of the fan casing, unwinding a layer of the fiber-reinforced wrap from the fan casing, and winding the layer of the fiber-reinforced wrap onto a collection drum. The fiber-reinforced wrap may heated to a temperature of about 120° C. to about 200° C. (e.g., about 125° C. to about 185° C.). Systems are also generally provided for removing a fiber-reinforced wrap from a fan casing.

14 Claims, 2 Drawing Sheets

(51) Int. Cl.

| | |
|---|---|
| *F01D 25/28* | (2006.01) |
| *F01D 21/04* | (2006.01) |
| *F01D 25/24* | (2006.01) |
| *B29C 63/00* | (2006.01) |
| *B64D 29/00* | (2006.01) |
| *B64D 27/16* | (2006.01) |
| *B29L 31/00* | (2006.01) |
| *F02C 7/04* | (2006.01) |
| *B32B 38/10* | (2006.01) |

(52) U.S. Cl.
CPC ........... *F01D 25/005* (2013.01); *F01D 25/24* (2013.01); *F01D 25/285* (2013.01); *B29L 2031/7504* (2013.01); *B32B 38/10* (2013.01); *B32B 2305/08* (2013.01); *B32B 2305/188* (2013.01); *B32B 2311/24* (2013.01); *B32B 2311/30* (2013.01); *B32B 2377/00* (2013.01); *B32B 2605/18* (2013.01); *B64D 27/16* (2013.01); *B64D 29/00* (2013.01); *F02C 7/04* (2013.01); *F05D 2230/80* (2013.01); *F05D 2300/603* (2013.01); *F05D 2300/701* (2013.01); *Y10T 156/1153* (2015.01); *Y10T 156/1174* (2015.01); *Y10T 156/195* (2015.01); *Y10T 156/1911* (2015.01); *Y10T 156/1956* (2015.01)

(58) Field of Classification Search
USPC .................. 156/711, 715, 752, 759, 760
See application file for complete search history.

(56) References Cited

U.S. PATENT DOCUMENTS

| | | |
|---|---|---|
| 4,490,092 A | 12/1984 | Premont |
| 5,437,538 A | 8/1995 | Mitchell |
| 7,351,304 B2 | 4/2008 | Liang et al. |
| 2008/0160122 A1* | 7/2008 | Blanton ............... B29C 53/566 425/90 |
| 2009/0064479 A1 | 3/2009 | Anderson et al. |
| 2011/0271730 A1 | 11/2011 | Curtis |
| 2012/0036910 A1 | 2/2012 | Leedham |
| 2012/0039703 A1 | 2/2012 | Swenson et al. |
| 2012/0042705 A1 | 2/2012 | Curtis |
| 2012/0102912 A1 | 5/2012 | Izadi et al. |
| 2012/0241419 A1* | 9/2012 | Rumsby ............ B23K 26/0846 219/121.6 |
| 2014/0003923 A1 | 1/2014 | Finnigan et al. |
| 2015/0343750 A1 | 12/2015 | Itoh |
| 2016/0097299 A1 | 4/2016 | Evans |
| 2016/0146050 A1 | 5/2016 | Molnar et al. |
| 2016/0369812 A1 | 12/2016 | Kling et al. |

OTHER PUBLICATIONS

Chinese Office action Corresponding to Application No. 201810480292 dated Dec. 3, 2019.

* cited by examiner

KEVLAR WRAP REMOVAL FROM FAN CASING

PRIORITY INFORMATION

The present application claims priority to Poland Patent Application No. P.421648 filed on May 19, 2017.

FIELD

This invention relates generally to turbine engines, and more particularly, to composite fan containment cases used with turbine engines.

BACKGROUND

High bypass turbofan engines are widely used for high performance aircraft that operate at subsonic speeds. These engines have a large fan placed at the front of the engine to produce greater thrust and reduce specific fuel consumption. The fan serves to compress incoming air, a portion of which is then delivered to the combustion chamber, with a larger portion being bypassed to the rear of the engine to generate additional engine thrust. The fan is circumscribed by a fan casing that must be capable of containing and minimizing damage to the engine from the remote event of a fan blade that is released from its hub during engine operation. For this reason, fan casings are equipped with specialized blade containment structures that serve to minimize structural damage to the engine as well as the aircraft to which the engine is mounted.

Various materials and configurations for blade containment structures have been proposed. Steel is well suited for blade containment on the basis of its mechanical properties, and particularly its toughness (strain to failure). However, a significant drawback to the use of steel in aerospace applications is its density. Consequently, thin metal (e.g., steel, aluminum, etc.) containment structures coupled with a fiber-reinforced wrap formed from KEVLAR® or another fiber-reinforced polymer material have been developed. For example, containment structures formed of relatively light-weight metals, such as aluminum alloys, may be coupled with such a wrapped material. In certain embodiments, a honeycomb structure may be used between the metal component and the wrap to increase the natural frequency of the casing assembly.

However, the metal casing portion of such composite fan casings is subject to corrosion or other damage that is occurring near the fiber-reinforced wrap. Such damage is difficult to repair without damaging the fiber-reinforced wrap.

Fiber-reinforced wrap is difficult and expensive to remove, particularly without further damaging the underlying metal portion and/or damaging the fiber-reinforced wrap.

As such, a need exists for a method of removing the fiber-reinforced wrap from a metal portion of a fan casing.

BRIEF DESCRIPTION

Aspects and advantages of the invention will be set forth in part in the following description, or may be obvious from the description, or may be learned through practice of the invention.

Methods are generally provided for removing a fiber-reinforced wrap from a fan casing. In one embodiment, the method includes heating the fiber-reinforced wrap while on a metal support (e.g., aluminum, steel, etc.) of the fan casing, unwinding a layer of the fiber-reinforced wrap from the fan casing, and winding the layer of the fiber-reinforced wrap onto a collection drum. For example, the fiber-reinforced wrap may heated to a temperature of about 120° C. to about 200° C. (e.g., about 125° C. to about 185° C.).

Systems are also generally provided for removing a fiber-reinforced wrap from a fan casing. In one embodiment, the system includes a mounting roll for a metal support of the fan casing, a heat source directed at the mount and configured to heat a surface of the fan casing when loaded onto the mounting roll, and a collection drum. For example, the heat source may be configured to locally heat at along a tangent line of the fan casing. The system may also include a tensioning roller positioned so as to impart tension onto a fabric unwound from the fan casing and prior to winding onto the collection drum. The system may also include a rolling mechanism connected to the collection drum and configured to rotate the collection drum.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
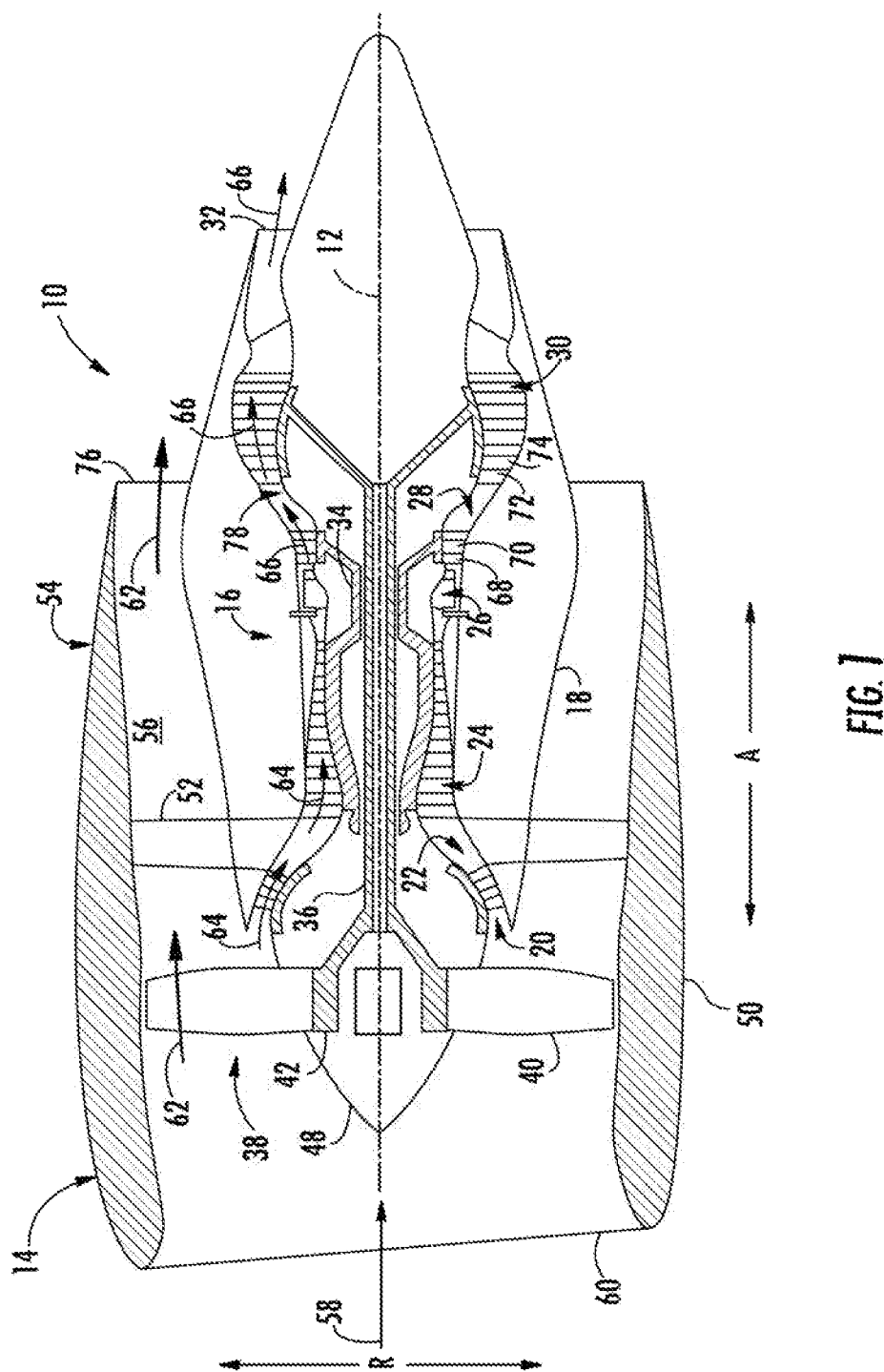
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of"

since the relative position above or below depends upon the orientation of the device to the viewer.

As used herein, the terms "first", "second", and "third" may be used interchangeably to distinguish one component from another and are not intended to signify location or importance of the individual components.

Methods are generally provided for removing a fiber-reinforced wrap from a thin metal portion of a fan casing. Generally, heat is utilized to melt the adhesive that adheres the fiber-reinforced wrap to the metal portion. Then, the fiber-reinforced wrap is removed by unwinding from the metal portion and onto a drum. As such, the metal portion of the fan casing may be reused by applying a new fiber-reinforced wrap thereon.

Figure 2:
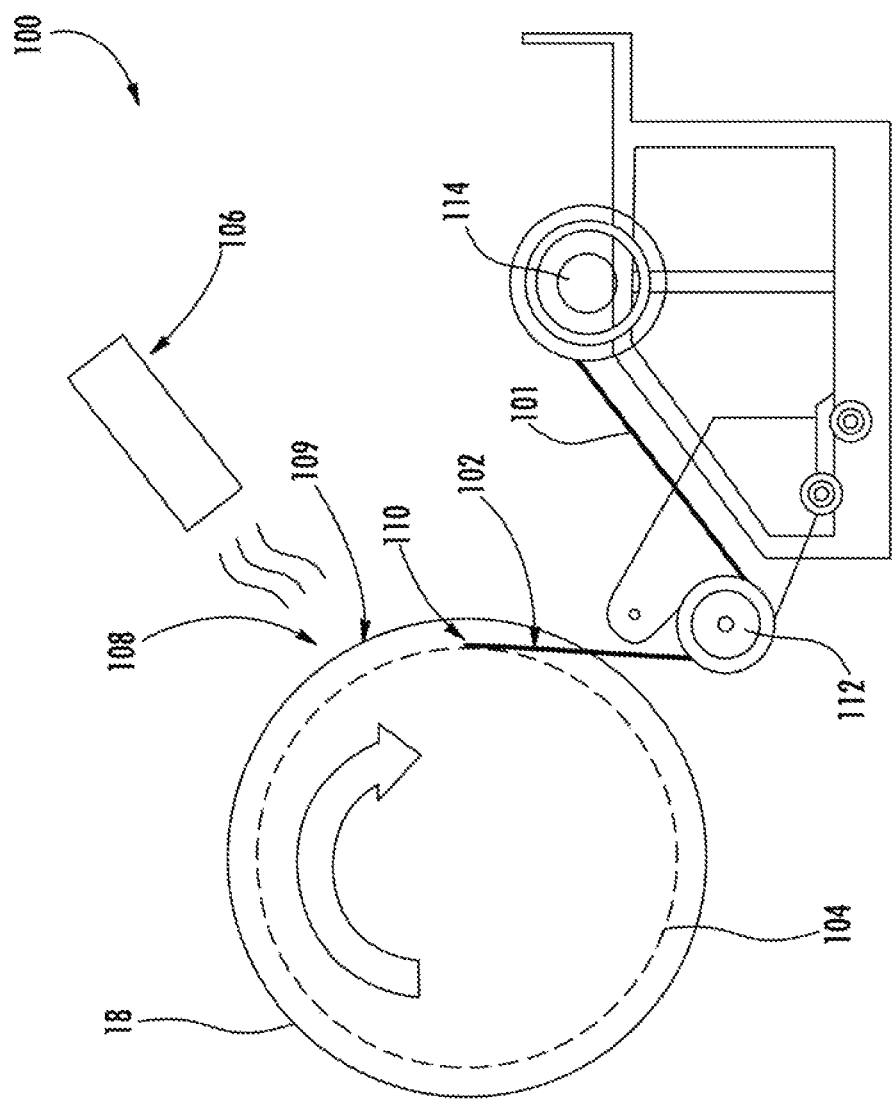
FIG. 2 is a perspective, cross-sectional view of an unwinding system for peeling a layer of a fiber-reinforced wrap from the fan casing and then rewinding the layer of the fiber-reinforced wrap onto a collection drum.

Referring now to the drawings, FIG. 2 is a schematic cross-sectional view of an unwind system 100 in accordance with an exemplary embodiment for removing a layer 101 of a fiber-reinforced wrap 102 from a metal support 104 on the composite fan casing 18. Generally, the metal support 104 may be any suitable metal material used in composite fan casing 18, such as aluminum, an aluminum alloy, steel, etc. The fiber reinforced wrap 102 may be in the form of a fabric sheet that include polymeric fibers (e.g., fibers of poly-paraphenylene terephthalamide). In particular embodiments, the fabric sheet is a woven sheet of the polymeric fibers.

The unwind system 100 is generally configured to remove the fiber-reinforced wrap 102 by unwinding the layers 101 from the metal support 104 through the use of heat. In the embodiment of FIG. 2, a heat source 106 is pointed to the heated zone 108 on the fan casing 18. In the embodiment shown, the heat source 106 focuses thermal energy locally onto a heated tangent line 109 of the fan casing 18. For example, the fiber-reinforced wrap 102 may be heated to a temperature of about 120° C. to about 200° C. at the heated tangent line 109, such as about 125° C. to about 185° C. Such temperatures may be sufficient to soften the fiber-reinforced wrap 102 for removal from the fan casing without warping or otherwise damaging the underlying metal support 104.

The layer 102 is then unwound from the fan casing 18 at a release tangent line 110 just past the heated tangent line 109, such as within about 60° around the circumference of the fan casing (e.g., within about 1° to about 45°). Since the release tangent line 110 is past the heated tangent line 109, the layer 101 of the fiber-reinforced wrap 102 may be more easily removed from the fan casing 18.

The unwound layer 101 of fiber-reinforced wrap 102 is passed, in the shown embodiment of FIG. 2, through a tensioning roller 112 and then rewound onto a collection drum 114 so that it may be removed from the metal support 104. The tensioning roller 112 may provide sufficient force to peel the heated layer 101 from the fan casing 18 along the release tangent line 110.

As stated, the system 100 may be useful for any fan casing 18 in a gas turbine engine. For example, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." Although further described below with reference to a turbofan engine 10, the present disclosure is also applicable to turbomachinery in general, including turbojet, turboprop, and turboshaft gas turbine engines, including marine and industrial turbine engines and auxiliary power units. As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of removing a fiber-reinforced wrap from a fan casing, the method comprising:
   heating the fiber-reinforced wrap while on a metal support of the fan casing;
   unwinding a layer of the fiber-reinforced wrap from the fan casing; and
   winding the layer of the fiber-reinforced wrap onto a collection drum.

2. The method of claim 1, wherein the layer of fiber-reinforced wrap comprises polymeric fibers.

3. The method of claim 1, wherein the layer of fiber-reinforced wrap comprises fibers of poly-paraphenylene terephthalamide.

4. The method of claim 1, wherein the layer of fiber-reinforced wrap is a woven fabric.

5. The method of claim 1, wherein the fiber-reinforced wrap is heated to a temperature sufficient to soften the fiber-reinforced wrap for removal from the fan casing.

6. The method of claim 1, wherein the fiber-reinforced wrap is heated to a temperature of about 120° C. to about 200° C.

7. The method of claim 1, wherein the fiber-reinforced wrap is heated to a temperature of about 125° C. to about 185° C.

8. The method of claim 1, wherein the metal support comprises aluminum.

9. The method of claim 1, wherein the metal support comprises steel.

10. The method of claim 1, wherein the layer of fiber-reinforced wrap is passed through a tensioning roller between unwinding from the fan casing and winding onto the collection drum.

11. The method of claim 1, wherein the fiber-reinforced wrap is heated at a heated tangent line of the fan casing.

12. The method of claim 11, wherein the layer of fiber-reinforced wrap is removed from the fan casing along a release tangent line, and wherein the heated tangent line and the release tangent line are within about 60° of each other around the circumference of the fan casing.

13. The method of claim 11, wherein the layer of fiber-reinforced wrap is removed from the fan casing along a release tangent line, and wherein the heated tangent line and the release tangent line are within about 1° to about 45° of each other around the circumference of the fan casing.

14. The method of claim 1, wherein the collection drum is connected to a rolling mechanism to rotate the collection drum.

* * * * *